(No Model.)
J. H. GILMAN.
WHEEL CULTIVATOR.
No. 336,310. Patented Feb. 16, 1886.
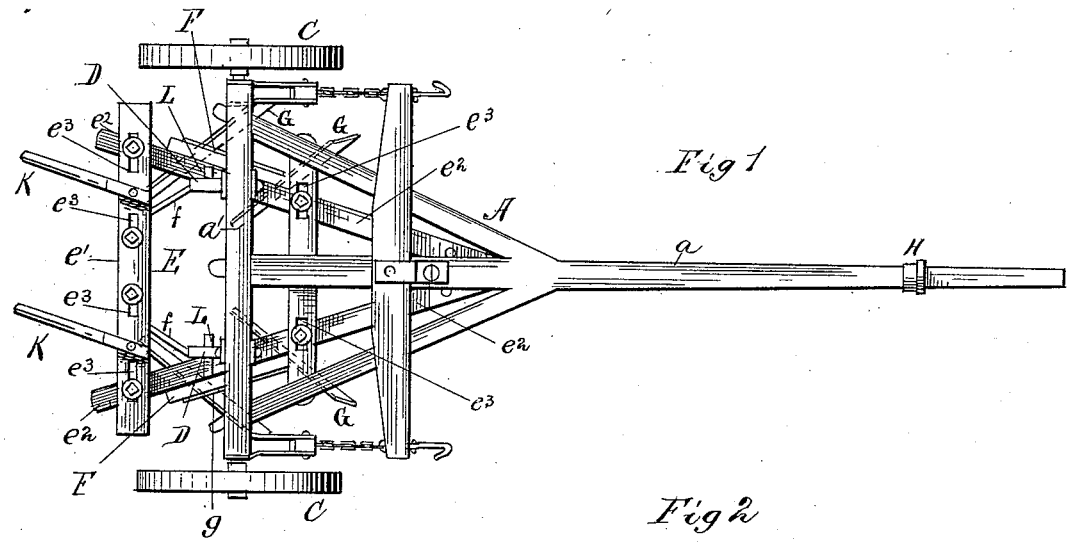
Fig 1
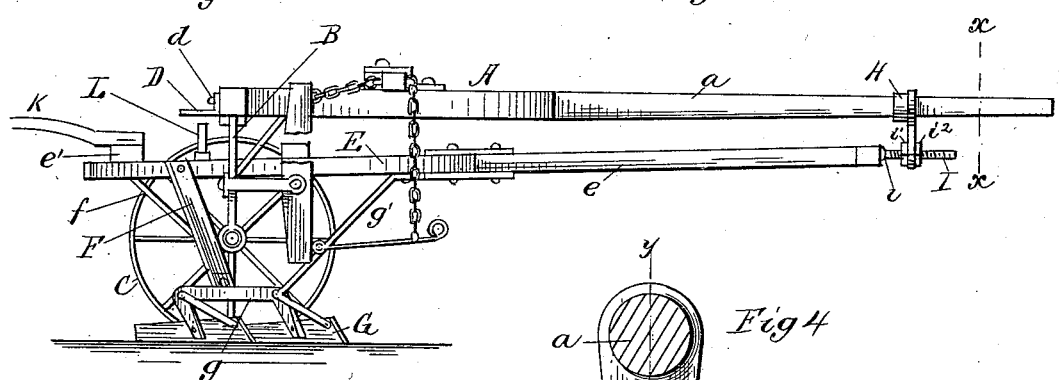
Fig 2
Fig 4
Fig 5
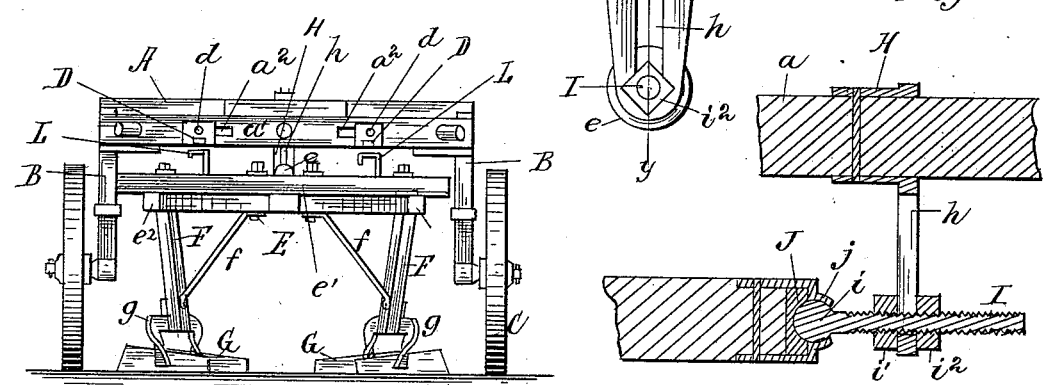
Fig 3
Witnesses
W. C. Corliss
A. M. Best
Inventor
John H. Gilman
By Coburn & Thacher
Attorneys

UNITED STATES PATENT OFFICE.

JOHN H. GILMAN, OF OTTAWA, ILLINOIS, ASSIGNOR TO THE KING & HAMILTON COMPANY, OF SAME PLACE.

WHEEL-CULTIVATOR.

SPECIFICATION forming part of Letters Patent No. 336,310, dated February 16, 1886.

Application filed September 21, 1885. Serial No. 177,770. (No model.)

*To all whom it may concern:*

Be it known that I, JOHN H. GILMAN, a citizen of the United States, residing at Ottawa, in the county of La Salle and State of Illinois, have invented certain new and useful Improvements in Wheel-Cultivators, which are fully set forth and described in the annexed specification, reference being had to the accompanying drawings, in which—

Figure 1 represents a plan view of a cultivator embodying my improvements; Fig. 2, a side elevation of the same with the wheel removed; Fig. 3, a rear elevation of the same; Fig. 4, a cross-section taken on the line $xx$, Fig. 1; and Fig. 5 a detail section of the same, taken on the line $yy$, Fig. 4.

The figures of the drawings are on two scales. Figs. 1, 2, and 3 are on the same scale, and Figs. 4 and 5 on the same scale, but enlarged from that of the former.

My invention relates to that class of implements generally known as "wheel-cultivators;" and it consists in providing two separate and distinct frames—one an independent wheel and draft frame and the other an independent rigid main or shovel frame, arranged underneath the former and provided with a tongue extending well to the front, where it is jointed to the tongue of the wheel-frame.

I will proceed to describe in detail one way in which I have carried out my invention in practical form, and will then point out definitely in the claims the special improvements which I believe to be new and wish to protect by Letters Patent.

In the drawings, A represents the wheel-frame, which is provided with a stiff tongue, $a$, and the usual appliances for the draft attachment. The wheel-standards B are fastened to this frame, depending therefrom and being provided with stud-axles on which are placed the wheels C. The wheel-frame is thus considerably raised above the axle of the wheels, thereby providing a wide open space or arch below the frame for the accommodation of the corn, the rows of which the cultivator is intended to straddle when in use. On the rear bar, $a'$, of this frame are two arms, D, which are secured in slots $a^2$ in the bar, being held in place by nuts $d$, which are turned on the ends of the bolts or pins that pass through the slot. These arms are thus adjustable laterally, and are for the purpose of suspending the lower or shovel frame. They may be of any suitable form—straight, bent, or hooked. I provide a second independent frame, E, which is of triangular form, in this respect resembling the wheel-frame just described as well as in many other general features, and is provided with a stiff tongue, $e$. The shovel-standards F are rigidly attached to this frame, and the shovels G rigidly attached to the lower ends of the standards by means of yokes or brackets $g$, each one of which carries a pair of shovels arranged one behind the other. The shovels themselves are long blades of somewhat tapering form and set at an angle to the line of draft, as shown in Fig. 1 of the drawings, being rigidly secured to the brackets, which in turn are rigidly attached to the standards. This form of shovel is old and well known and requires no further description here.

The shovels and standards are suitably braced by means of brace-rods $f$, extending from the standards to the rear bar, $e'$, of the frame, and similar rods, $g'$, extending from the brackets forward to the same frame, thus making a rigid structure throughout. This shovel-frame is a little narrower than the wheel-frame, whereby it is adapted to be arranged underneath the latter in the open space between the wheels, as shown in the drawings. The tongue $e$ of the shovel-frame is extended well forward under the tongue of the wheel-frame—in fact, I prefer that it should reach nearly to the end of the latter—and its forward end is connected to the upper tongue by a joint of some description which will permit the free movement of the lower frame both vertically and laterally. I accomplish this in a peculiar way, as follows: The bracket H is fastened to the tongue of the wheel-frame from which it depends, being provided in its lower part with a vertical slot, $h$. This slot is adapted to receive a rod, I, on one end of which is formed a ball, $i$, which is held in a socket-piece, J, fastened to the end of the lower tongue and provided with a socket, $j$, adapted to receive and hold the said ball, thus making a ball-and-socket joint between the rod and the shovel-frame tongue. This short rod is also threaded, and is provided with two nuts, $i'$ and $i^2$, one arranged in front and the other in rear of the slot in the bracket. It is obvious that by turning these nuts against the bracket the rod I will be clamped and held firmly in position. At the same time the ball-and-socket joint will permit the shovel-frame to be raised and lowered and moved laterally underneath the wheel-frame.

In order to regulate the pitch of the shovels, the tongue of the shovel-frame is adjusted vertically by adjusting the rod I in the slot of the bracket.

The shovel-frame is provided with handles K, attached to the rear bar, by means of which the frame may be moved laterally or vertically when the implement is used as a walking-cultivator. When it is adapted for use as a riding-cultivator, it must be provided with handles or levers arranged within reach of the rider for controlling this shovel-frame. Such devices are, however, well known.

The side bars, $e^2$, of the shovel-frame are attached to the tongue at their forward ends by a pivotal connection, which permits the frame to be spread or contracted by suitably adjusting these bars. To provide for this adjustment, both the rear and front bars are provided with slots $e^3$, through which bolts pass that secure the side bars and braces to the cross-bars. Hooks L are attached to the side bars of the shovel-frame, and are adapted to engage with the arms D on the rear bar of the wheel-frame, whereby, evidently, the shovel-frame may be suspended from the wheel-frame; but as the side bars of the shovel-frame are adjustable laterally the distance between these hooks is variable; hence the lateral adjustment of the suspension-arms is provided for, as already explained above.

Now, in the implement constructed and arranged as described above there are several important advantages. The arrangement of the shovel-frame below the wheel-frame secures the entire independence of the two frames, so that they may be disconnected with the greatest facility and without any interference by parts of one with those of the other. This arrangement also permits the shovels to be arranged partly or wholly in rear of the wheel-axles, if desired, without in any way interfering with the wheel-frame and the ready detachment of the shovel-frame therefrom. This latter arrangement of the shovel-frame and shovels provides for greater range of lateral movement, which result is also aided by the triangular shape of the shovel-frame, whereby the rear portion carrying the shovels may be moved up to the wheels, or even beyond if the shovel-frame projects sufficiently in the rear. The extension of the shovel-frame tongue well forward and nearly to the end of the wheel-frame tongue provides for an easy lateral movement of the shovel-frame on a long radius, instead of a short sharp movement that would be occasioned if the radius were short. I believe all of these advantages will be readily apprehended by all those familiar with the use of cultivators, and that it will be seen that I have provided a practical implement in which the advantages of the wheel-cultivator are combined with those of the walking-cultivator having stiff frame and shovels, substantially as described above. The arrangement of the shovel-frame below the wheel-frame also avoids large cumbersome structures. It must be evident that if the shovel-frame is placed above the wheel-frame, and the latter is raised sufficiently for practical use for cultivating corn, the upper or shovel frame will stand very high, and the implement will be cumbersome, awkward, and inconvenient to manage.

I may add here that the peculiar shovels here shown and described have been found very satisfactory for the ordinary cultivation of corn, especially on prairie land, and are in popular use.

I do not wish to be understood as limiting myself in all particulars to the details of construction and arrangement herein shown and described, for changes may be made in some particulars without departing from the main and controlling features of my invention, which I have set forth above.

Having thus described my invention, what I claim as new, and desire to protect by Letters Patent, is—

1. In a wheel-cultivator, the independent wheel-frame A, in combination with the wheel-standards B, depending therefrom and provided with axles for the wheels C, a stiff tongue, $a$, attached to said wheel-frame, the independent shovel-frame E, of triangular form, arranged underneath the wheel-frame, the shovel-standards F, rigidly attached to the frame E and of such length as to raise the latter up within the arch and between the wheel-standards of the wheel-frame, the long tapering blade shovels G, rigidly fastened to the standards F, and the stiff tongue $e$, attached to the shovel-frame, and coupled to the tongue $a$ near its forward end by a universal-joint connection, all constructed and arranged substantially as and for the purposes set forth.

2. The independent wheel-frame A, provided with the stiff tongue $a$, in combination with the independent shovel-frame E, arranged underneath the former and provided with the stiff tongue $e$, the slotted bracket H, and the rod I, connected to the front end of the tongue $e$ by a universal joint, substantially as and for the purposes set forth.

3. The independent wheel-frame A, in combination with the supports D, adjustably connected thereto, the independent shovel-frame E, the side bars of which are adjustable laterally, and the suspension-hooks L, attached to said side bars, substantially as and for the purposes set forth.

JOHN H. GILMAN.

Witnesses:
 S. E. KING,
 G. C. RICKLY.